US009886837B1

(12) United States Patent
Alexander

(10) Patent No.: US 9,886,837 B1
(45) Date of Patent: Feb. 6, 2018

(54) PERSONAL ALARM SYSTEM

(71) Applicant: Frederick Alexander, Chicago, IL (US)

(72) Inventor: Frederick Alexander, Chicago, IL (US)

(*) Notice: Subject to any disclaimer, the term of this patent is extended or adjusted under 35 U.S.C. 154(b) by 0 days.

(21) Appl. No.: 15/283,395

(22) Filed: Oct. 1, 2016

Related U.S. Application Data

(60) Provisional application No. 62/236,304, filed on Oct. 2, 2015.

(51) Int. Cl.
*G08B 21/24* (2006.01)
*G06K 7/10* (2006.01)

(52) U.S. Cl.
CPC ......... *G08B 21/24* (2013.01); *G06K 7/10366* (2013.01)

(58) Field of Classification Search
CPC .............................. G08B 21/24; G06K 7/10366
USPC ...................................................... 340/539.11
See application file for complete search history.

(56) References Cited

U.S. PATENT DOCUMENTS

| 7,271,715 | B2 | 9/2007 | Aupperle et al. | |
|---|---|---|---|---|
| 7,898,414 | B2* | 3/2011 | Spano | G08B 21/24 340/539.13 |
| 8,810,392 | B1* | 8/2014 | Teller | G08B 21/24 235/385 |
| 9,779,612 | B2* | 10/2017 | Darval | G08B 21/24 |
| 2005/0285739 | A1 | 12/2005 | Velhal et al. | |
| 2006/0192674 | A1* | 8/2006 | Roberta | G08B 1/08 340/539.23 |
| 2010/0097237 | A1* | 4/2010 | Christiansen | G08B 13/1427 340/686.6 |
| 2013/0234853 | A1* | 9/2013 | Kazerouni | G08B 13/1427 340/572.1 |
| 2014/0240088 | A1* | 8/2014 | Robinette | G08B 13/1427 340/5.61 |
| 2015/0242665 | A1* | 8/2015 | Antonescu | G06K 19/0724 340/8.1 |

* cited by examiner

*Primary Examiner* — Hirdepal Singh
(74) *Attorney, Agent, or Firm* — RG Patent Consulting LLC; Rachel Gilboy

(57) ABSTRACT

A wireless personal alarm system designed to prevent a person from inadvertently losing or forgetting valuable personal articles such as cellphone, wallet, or keys. The system includes tags which are affixed to a valuable personal article, and includes facets which each correspond to a different tag. When the tag and its corresponding facet are too far apart, the system activates an alert to the user, thereby alerting the user to not forget the article affixed to the tag.

7 Claims, 3 Drawing Sheets

PERSONAL ALARM SYSTEM

CROSS-REFERENCE TO RELATED APPLICATION

The present application is related to and claims priority from prior provisional application Ser. No. 62/236,304, filed Oct. 2, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of notification devices and more specifically relates to a wireless personal alarm system designed to provide real-time notification alerts to prevent a person from inadvertently losing or forgetting valuable personal articles such as cellphone, wallet, or keys

2. Description of the Related Art

In order to achieve success in the marketplace, any potential invention must meet two basic requirements. First, there must be a demonstrated need or desire among a group of people, a need or desire that the invention will satisfy. Such a need may well be unconscious, unsuspected until the new invention arrives to make a previous lack explicit, and a better way known. Second, a sufficient number of people must share that need or desire. In the case of the invention to be unveiled and discussed in the course of this report, both of these requirements are easily met. The proof of this is easily established with two simple questions: 1) Have you ever forgotten your keys, cellphone, or wallet, and wasted valuable time going back for them? And, 2) Do you know anyone who hasn't? The invention to be unveiled, described, and discussed in the course of this report would enable anyone to remember these and other essential possessions—with a little electronic help—and get about their business.

Various attempts have been made to solve problems found in personal object proximity alarm device master controller and individual sensors which allows a user to attach the sensors to personal items and will then send an alarm noise to the device when the master controller is out of a user-defined proximity to the personal items art. Among these are found in: U.S. Pat. No. 7,271,715 to Bryan Eric Aupperle; U.S. Pat. No. 7,898,414 to Michael J. Spano; and U.S. Publication No. 2005/0285739 to Ravindra Velhal. This prior art is representative of personal object proximity alarm device master controller and individual sensors which allows a user to attach the sensors to personal items and will then send an alarm noise to the device when the master controller is out of a user-defined proximity to the personal items.

None of the above inventions and patents, taken either singly or in combination, is seen to describe the invention as claimed. Thus, a need exists for a reliable Forget It Not, a wireless personal alarm system designed to prevent a person from inadvertently losing or forgetting valuable personal articles such as cellphone, wallet, or keys incorporated into a stylish bracelet or necklace, the Forget It Not system would function as a sort of "electronic leash" between the user and his or her essential personal articles, issuing an alert to the user should these articles be forgotten and to avoid the above-mentioned problems.

BRIEF SUMMARY OF THE INVENTION

In view of the foregoing disadvantages inherent in the known notification device art, the present invention provides a novel Forget It Not. The general purpose of the present invention, which will be described subsequently in greater detail, is to provide a wireless personal alarm system designed to prevent a person from inadvertently losing or forgetting valuable personal articles such as cellphone, wallet, or keys incorporated into a stylish bracelet or necklace, the Forget It Not system would function as a sort of "electronic leash" between the user and his or her essential personal articles, issuing an alert to the user should these articles be forgotten. The features of the invention which are believed to be novel are particularly pointed out and distinctly claimed in the concluding portion of the specification. These and other features, aspects, and advantages of the present invention will become better understood with reference to the following drawings and detailed description.

Exemplary embodiments disclosed herein describe a personal alarm system for providing real-time notification alerts. The personal alarm system includes one or more tags and one or more facets. Each facet includes a receiver and a tracker control unit (TCU) for establishing a communication connection with a corresponding tag which communicates at a same frequency as the facet. Each facet includes a receiver, an alarm, and a facet control unit (FCU) for activating the alarm when the communication connection between the tag and its corresponding facet is broken. The communication connection between the tag and its corresponding facet is broken when the distance between the tag and facet exceeds a defined proximity.

In some exemplary embodiments, each tag communicates at a different frequency and each tag is associated with a corresponding facet. Each tag and its corresponding facet communicate at a same frequency.

In some exemplary embodiments, each facet is attached to a personal article of the user.

In some exemplary embodiments, each facet is embedded in an ornamental pendant.

In some exemplary embodiments, each pendant is attached to a wearable article.

In some exemplary embodiments, the alarm includes at least one or more from the group consisting of a vibrating motor, an audible unit, or a flashing LED.

In some exemplary embodiments, the wearable article includes at least one or more from the group consisting of a necklace or a bracelet.

The present invention holds significant improvements and serves as a personal alarm system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, the personal alarm system, is constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a notification device and more particularly to a Forget It Not, a wireless personal alarm system designed to prevent a person from inadvertently losing or forgetting valuable personal articles such as cellphone, wallet, or keys incorporated into a stylish bracelet or necklace, the Forget It Not system would function as a sort of "electronic leash" between the user and his or her essential personal articles, issuing an alert to the user should these articles be forgotten.

Generally speaking, the Forget It Not comprising a novel product offering consumers a practical solution to the aforementioned challenges. As the name implies, the Forget It Not comprises a specially designed battery-powered, wireless personal electronic system for keeping one's essential personal articles—cellphone, keys, wallet, laptop or tablet, etc.—close at hand. This will provide a continuous wireless link between a special Forget It Not necklace or bracelet that the individual wears, and their most important personal articles. Should the bracelet or necklace be separated by too great a distance from any of these articles, the user will be alerted by a vibration in the bracelet or necklace, and perhaps by an audible alert tone and flashing LED light as well. The alerts occur, then, when the user has forgotten his wallet, or her phone or keys—and serve to remind the user to "Forget It Not."

The Forget It Not system will be based in a bracelet or necklace attractively styled with a series of pendant-like "facets." Each of these facets will correspond to a given personal article: one facet corresponding to one's purse or wallet; one facet to one's cellphone; etc. Each facet will accommodate a compact lithium-ion battery and be equipped with a corresponding, button-sized, adhesive-backed "tag." The tags will then be affixed to the individual articles.

Each facet-and-tag combination would operate on a slightly different RF frequency, and a continuous loop of communication would be established as each facet transmits, and each tag receives and reflects, their signals in their specific frequencies. Thus, when the distance between the facet and its corresponding article exceeds 5 to 10 feet, the continuous communications loop is broken. When that link is broken, its absence permits the closing of an electrical circuit within the facet—and that circuit in turn powers a vibrating, audible, and/or flashing LED alarm in the facet. The alarm—whether vibrating, beeping, or flashing—alerts the user to the item they've strayed from. Once they've retrieved the article, they can disable the alarm simply by pressing the operative Facet.

Figure 1:
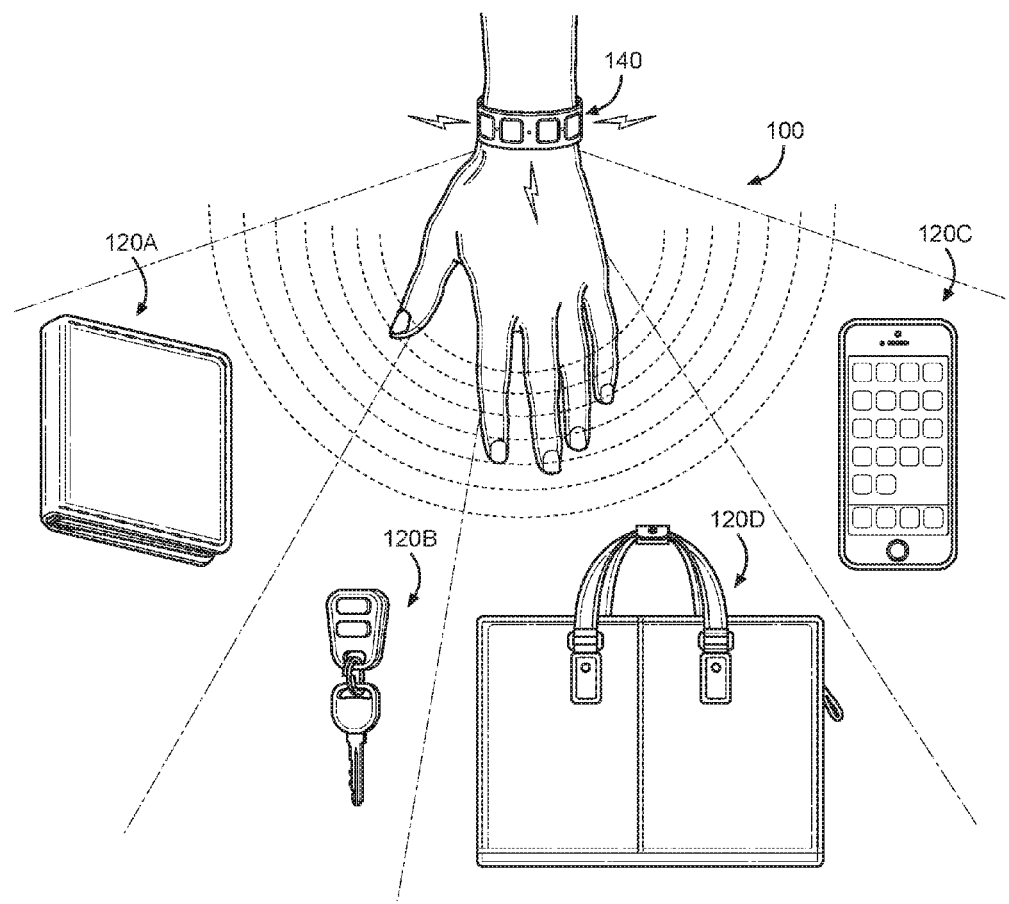
FIG. 1 shows a perspective view illustrating a personal alarm system according to an embodiment of the present invention.
Figure 2:
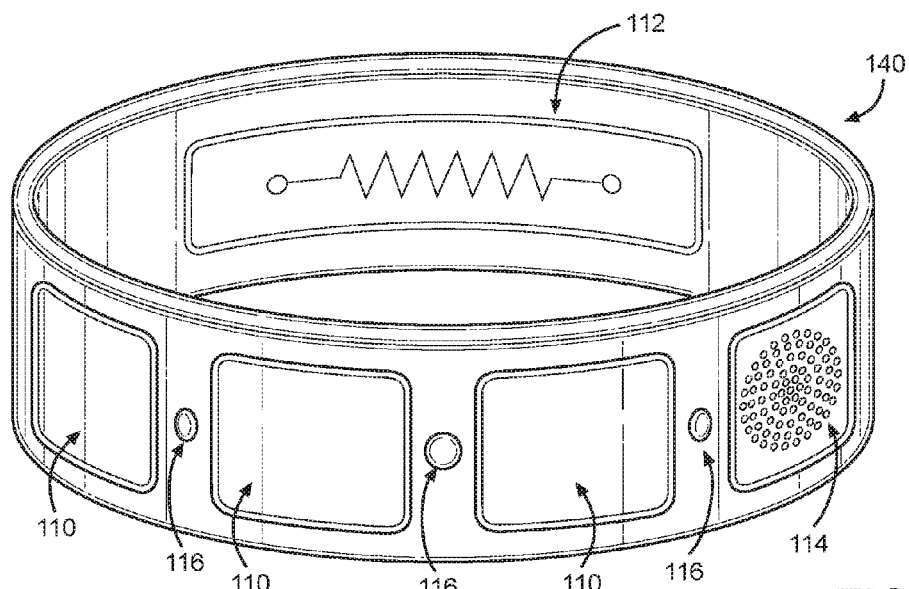
FIG. 2 is a perspective view illustrating the personal alarm system according to an embodiment of the present invention of FIG. 1.
Figure 3:
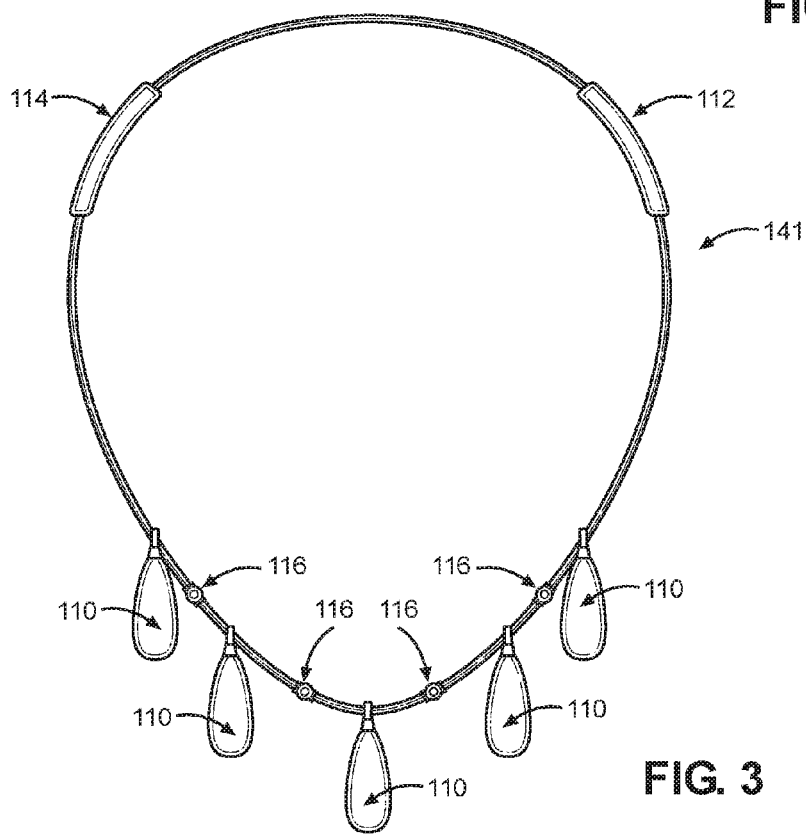
FIG. 3 is a perspective view illustrating the personal alarm system according to an embodiment of the present invention of FIG. 1.
Figure 4:
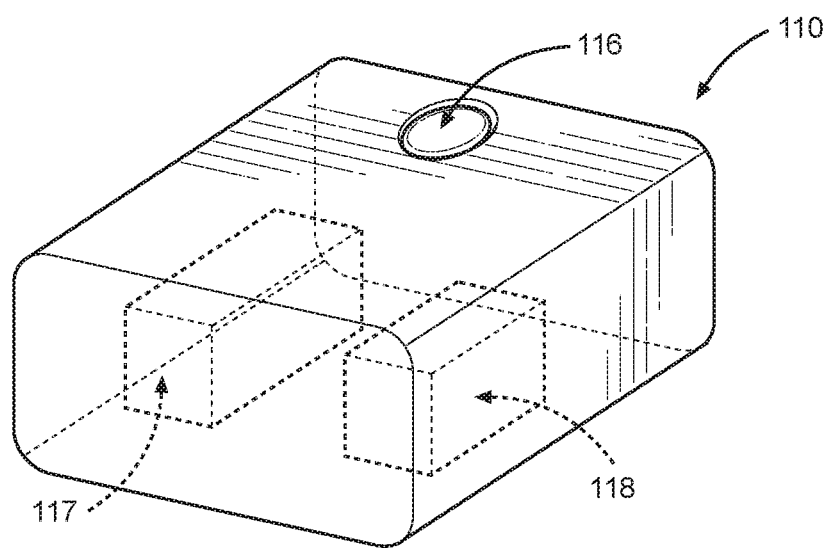
FIG. 4 is a perspective view illustrating the personal alarm system according to an embodiment of the present invention of FIG. 1.
Figure 5:
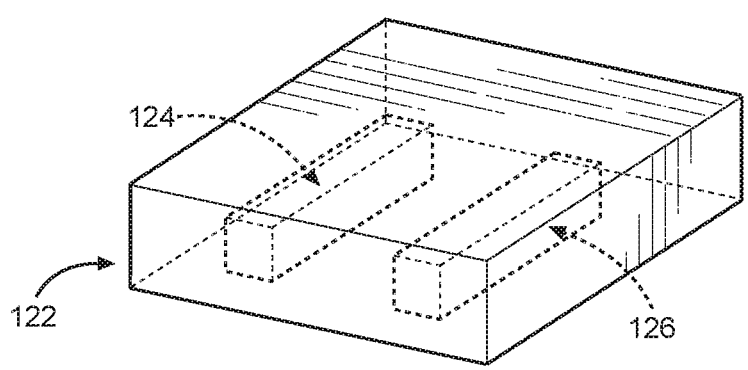
FIG. 5 is a flowchart illustrating a method of use for the personal alarm system according to an embodiment of the present invention of FIGS. 1-4.

As illustrated in FIGS. 1-5, the valuable personal articles may include a wallet 120a, keys 120b, cellphone 120c or a purse 120d. The personal alarm system 100 includes tags 122 which are each affixed to a valuable personal article, and includes facets 110 to be worn by a user which are each associated with each respective one of the tags 122.

Each facet 110 can be embedded in an ornamental pendant. The facets 110 are incorporated into a stylish bracelet 140 or necklace 141, which functions as an "electronic leash" between the user and his or her valuable personal articles. Should the bracelet or necklace be separated by too great a distance from the tags 122 any of these articles, the user will be alerted by a vibration in the bracelet or necklace by a vibrator 112, and perhaps by an audible alert tone via an audio emitter 114 and flashing LED lights 116 as well. The alerts occur when the user has forgotten his wallet, or her phone or keys, and serve to remind the user to "Forget It Not."

Each tag 122 and its corresponding facet 110 communicate at a same specific radio frequency (RF), and each facet 110 communicates at a different radio frequency. Each facet 110 includes a receiver 117 and a tag tracker control unit 118. The receiver 117 receives signals transmitted from a corresponding tag transmitter 124 at a specific frequency. The tag tracker control unit 118 establishes a communication connection with the corresponding facet which communicates at a same frequency as the tag.

Each facet 110 may further include an alarm as well. The tag transmitter 124 is controlled by a tag control unit 126 and transmits signals to its associated facet 110. The alarm may include, for example, a flashing LED light, which is powered upon activation from the tag tracker control unit 118. The tag tracker control unit 118 activates the alarm when the communication connection between the tag and the facet is broken. The communication connection is broken when the distance between the tag and facet exceeds a defined distance, such as, for example, 5 feet.

The tag tracker control unit 118 and the tag control unit 126 may include a central processing unit (CPU) or microprocessor, random access memory (RAM), non-volatile secondary storage (e.g., a hard drive, a floppy drive, and a CD-ROM drive), and network interfaces (e.g., a wired or wireless Ethernet card and a digital and/or analog input/output card). Program code and data can be stored in the non-volatile secondary storage and provided to the CPU for execution.

In operation, each facet-and-tag combination operate on a slightly different RF frequency, and a continuous loop of communication is established as each tag transmits and each facet receives their signals in their specific frequencies. When the distance between the facet and its corresponding tag exceeds 5 to 10 feet (i.e., the defined proximity), the continuous communications loop is broken. When that link is broken, its absence permits the closing of an electrical circuit within the facet, and that circuit in turn powers the vibrating, audible, and/or flashing LED alarm in the bracelet, necklace, and/or facet. The alarm alerts the user to the item they've strayed from. Once they've retrieved the article, they can disable the alarm.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A personal alarm system, the system comprising:
    a plurality of facets, each comprising:
        a receiver; and
        a tag tracker control unit;
        wherein said tag tracker control unit is adapted to establish a communication connection with a corresponding tag which communicates at a same frequency as said facet; and
        an alarm; and
    a plurality of tags, each comprising:
        a transmitter;
        a tag control unit:
        wherein each of said plurality of tags is adapted to be attached to a personal article of a user;
        wherein said tag control unit is adapted to activate said alarm when said communication connection between said tag and its corresponding facet is disconnected;
    wherein each of said plurality of tags communicates at a different radio frequency from one another;
    wherein each of said plurality of facets is associated with a corresponding one of said plurality of tags,
    wherein each of said plurality of tags and its corresponding facet communicate at the same radio frequency;
    wherein said communication connection between any one of said plurality of tags and its corresponding facet is disconnected when the distance between said tag and said facet exceeds a pre-determined distance; and
    wherein when said communication is disconnected said alarm activates to warn said user.

2. The system of claim 1, wherein each of said at least one facet is adapted to be attached to a wearable article.

3. The system of claim 2, wherein said wearable article is formed as a necklace.

4. The system of claim 2, wherein said wearable article is formed as a bracelet.

5. The system of claim 1, wherein said alarm includes a vibrator.

6. The system of claim 1, wherein said alarm includes an audio emitter.

7. The system of claim 1, wherein said alarm includes flashing LED lights.

* * * * *